United States Patent

[11] 3,581,110

[72] Inventor Richard J. Belcastro
Addison, Ill.

[21] Appl. No. 799,704
[22] Filed Feb. 17, 1969
[45] Patented May 25, 1971
[73] Assignee GTE Automatic Electric Laboratories Incorporated
Northlake, Ill.

[54] APPARATUS FOR EVALUATING SIGNALS READ FROM MAGNETIC MEDIUM
5 Claims, 2 Drawing Figs.

[52] U.S. Cl. .......... 307/237, 307/236, 307/273
[51] Int. Cl. .......... H03k 5/08
[50] Field of Search .......... 307/236, 237, 273; 328/31, 118, 140, 165, 169, 171

[56] References Cited
UNITED STATES PATENTS

| | | | |
|---|---|---|---|
| 3,187,199 | 6/1965 | Chur .......... | 307/237(X) |
| 3,290,518 | 12/1966 | Guisinger .......... | 307/236(X) |
| 3,398,298 | 8/1968 | Baun .......... | 307/237(X) |
| 3,493,877 | 2/1970 | Jacobson .......... | 307/241(X) |

*Primary Examiner*—Roy Lake
*Assistant Examiner*—James B. Mullins
*Attorneys*—Spencer E. Olson, K. Mullerheim and B. E. Franz

ABSTRACT: A two-stage transistorized, magnetic drumhead readout amplifier including a positive signal limiter and a negative signal limiter, followed by an excursion detector arranged to pass only that portion of a signal that swings from the positive to the negative direction, and then only of a predetermined magnitude. The passed signal is shaped by a monostable multivibrator prior to application to suitable logic circuitry.

PATENTED MAY 25 1971 3,581,110

INVENTOR.
RICHARD J. BELCASTRO
BY Bernard E. Franz
ATTY.

APPARATUS FOR EVALUATING SIGNALS READ FROM MAGNETIC MEDIUM

BACKGROUND OF THE INVENTION

1. Field of the Invention

This invention relates generally to improvements in circuits for translating magnetically recorded binary data into digital form. More particularly, the invention relates to an improved circuit for a read amplifier for the information sensed from a magnetic drum and for transferring this information in useable form into a register or other apparatus.

2. Description of the Prior Art

Digital information is recorded on the magnetic surface of a drum in the form of discrete magnetized areas. In sensing this information a transducer or magnetic head is located adjacent the drum surface to generate signals in the transducer in accordance with the recorded data. These signals from the transducer are such that a sensed "1" is a single period of a sine wave. They are then fed into a read amplifier which has built in threshold detection, and the signal "1" is converted to a pulse whose magnitude is compatible with the logic used in the system. The signal from the transducer can vary in magnitude, anywhere from 10 to 100 millivolts for a typical system. Hence, a very stable, high gain amplifier must be used.

Another consideration in any system is that the leads from the recording head to the amplifier normally are in an electromagnetically noisy environment, where different noise patterns of the proper magnitude could be sensed by the amplifier and produce a false "1" signal.

SUMMARY OF THE INVENTION

The system according to the invention utilizes a two-stage transistor amplifier having a pair of signal limiting circuits combined with the bias network of the transistors, in such a manner as to limit the swing of its output signal to a fixed magnitude in either the positive or negative direction. This is followed functionally by an excursion detector biased to pass a trigger pulse only in response to a signal swing from the positive to the negative direction across the reference level. It is necessary for the signal to swing across the reference level for the reason that the signal is clipped above and below the reference level at a value equal to only one-half the level required by the excursion detector to form a trigger pulse for the pulse shaper. Thus, if a spurious signal of a proper magnitude, but in only a positive direction, is received, it will be amplified and clipped so that the output of the amplifier will only be one-half that required to trigger the multivibrator pulse shaper. A similar signal, but in a negative direction, would be treated similarly, resulting in no output.

Similarly, a sine wave noise unsymmetrical with respect to zero would also be treated as above. A sine wave noise symmetrical with respect to the zero reference level but of opposite phase would result in the production of two pulses of inadequate amplitude to operate the multivibrator, again resulting in no output. Thus, it can be seen that, the only noise that could trigger the multivibrator through the novel amplifier configuration here disclosed, is one that practically duplicates a true signal from the transducer.

BRIEF DESCRIPTION OF THE DRAWINGS

The novel features that are considered characteristic of this invention are set forth with particularity in the appended claims. The invention itself both as to its organization and method of operation, as well as additional objects and advantages thereof, will best be understood from the following description when read in connection with the accompanying drawing, in which:

DESCRIPTION OF THE PREFERRED EMBODIMENT

Figure 1:
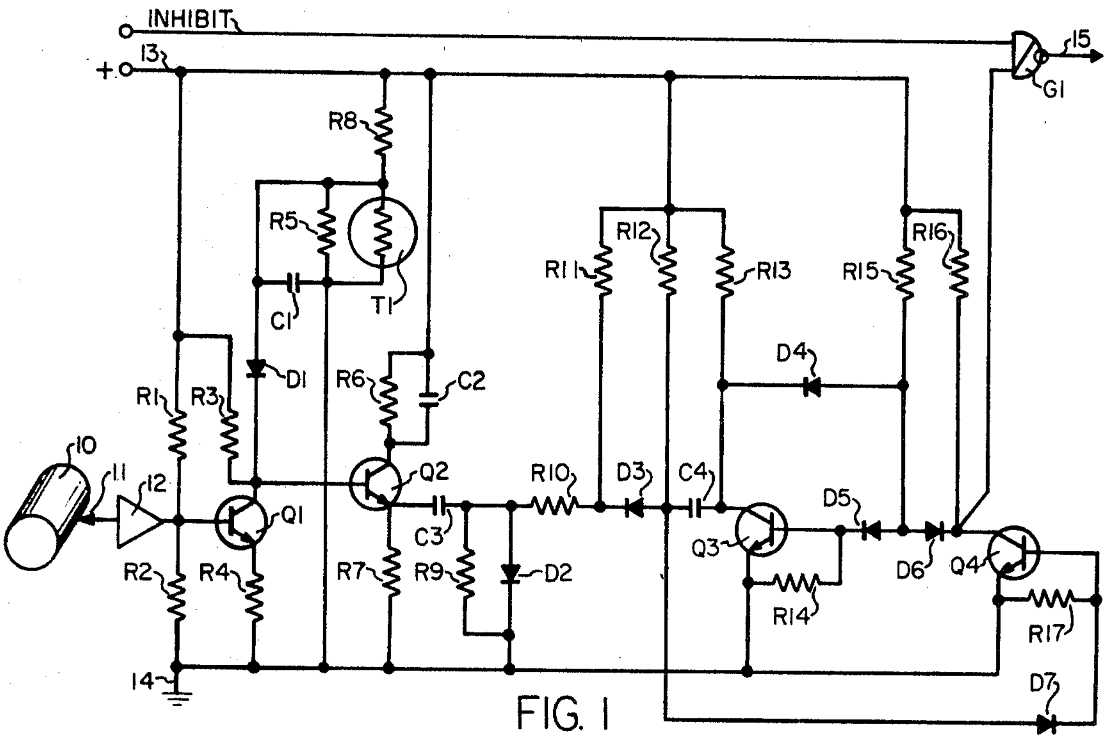
FIG. 1 is a schematic diagram of the circuit according to the invention.

The circuit of FIG. 1 consists of the final stages of an amplifier and pulse former for a single magnetic drumread out channel. The signal from the surface of the magnetic drum 10 is sensed by a pickup head or transducer 11 and amplified in passing through the preamplifier 12. The output from amplifier 12 is connected to the base of NPN transistor Q1 serving as the penultimate amplifier stage. The base of transistor Q1 is biased to the proper operating potential in an emitter bias configuration by the voltage divider consisting of resistors R1 and R2 connected between a source of positive potential 13 and ground 14. The collector of transistor Q1 is connected to the positive potential source 13 through resistor R3 and the emitter to ground potential 14 through resistor R4.

The input to the succeeding stage is taken from the collector of transistor Q1 and connected directly to the base of transistor Q2, which is also of an NPN type. The collector of transistor Q2 is connected to the positive potential source 13 through resistor R6. The emitter is connected to ground 14 through resistor R7.

Resistor R6 is used to limit the amplitude of the signal in the positive direction. Resistor R6 is shunted by capacitor C2 to provide a low impedance positive voltage clamp to AC signals. The base of transistor Q2 is maintained at the proper bias voltage by the collector voltage of transistor Q1, which is possible because of the high impedance provided by transistor Q2 and resistor R7. Resistors R5 and R8 comprise a voltage divider network to provide the negative voltage clamp to AC signals; while diode D1 permits the negative clamping only when the base of transistor Q2 drops below the anode of diode D1. A temperature sensitive resistor T1 is connected in shunt with resistor R5 so that the negative voltage clamping point tracks the quiescent base voltage of transistor Q2. A capacitor C1 also shunts resistor R5 to create an RC filter with a time constant such that it serves to limit the maximum signal amplitude in the negative direction that can be applied to the base of the transistor Q2, and provide the necessary low impedance.

A second path to ground 14 is provided from the emitter of transistor Q2 through capacitor C3 and resistor R9 in series. The resistor R9 is shunted by diode D2 which has its cathode end connected to ground 14. This configuration of components C3, R9 and D2 comprises the excursion detector, polarized by diode D2 to pass to the multivibrator pulse former only a negative-going signal, the magnitude of which is equal to the peak-to-peak value of the signal at the emitter of transistor Q2. This also shifts the reference level, thereby converting the voltage swing to a single pulse. Resistors R10 and R11 in series with resistor R9, from ground potential 14 to the positive potential source 13 act as a voltage divider to provide the proper relative operating levels for the threshold of the pulse former and the diodes D2 and D3. Coupling diode D3 is polarized with its cathode connected to the junction of resistors R10 and R11 and its anode connected to the junction of resistor R12 and capacitor C4.

Resistor R12 is connected from the positive potential source to the anode of diode D7, through it in series with resistor R17 to ground. The cathode of diode D7 is also connected to the base of transistor Q4, which has its emitter connected directly to ground 14. Transistors Q3 and Q4 are used in a monostable multivibrator circuit. Transistor Q4 is normally conducting due to the positive bias on its base resulting from the current flowing through resistor R12 and diode D7 through the base-emitter junction to ground. The resistor R16 connected from positive battery 13 to the collector of transistor Q4 completes the main path from ground 14 through transistor Q4. Capacitor C4, connected from the collector of transistor Q3 to the junction of diodes D3, D7 and resistor R12, is maintained in a charged state through resistor R13 in the output circuit of transistor Q3. Diodes D5 and D7 serve to improve the overall noise immunity by holding off the coupling pulses. A clamp circuit consisting of diode D4 with its cathode connected to the collector of transistor Q3 and a resistor R5 connected to the positive battery 13, prevents transistor Q3 from saturating to improve the switching time. The bias for maintaining transistor Q3 in a normally nonconductive state is supplied by resistor R14 connected from ground 14 to the base of transistor Q3 and also to the cathode of diode D5, through it and resistor R15 to positive battery 13.

When a trigger pulse through diode D3 arrives, it turns transistor Q4 off which in turn turns on transistor Q3, through the use of coupling diode D6 connected with its cathode from the collector of transistor Q4 to the junction of resistor R15 and anode of diode D5. Resistor R12 and capacitor C4 now time out to hold transistor Q4 off for the period determined by the R12–C4 time constant. This period during which transistor Q4 is nonconductive results in a positive pulse, of a duration equal to the time constant of capacitor C4 and the resistor R12.

A NAND gate G1, combining the output of the multivibrator and an inhibit lead are used to gate the output at the desired time.

Figure 2:
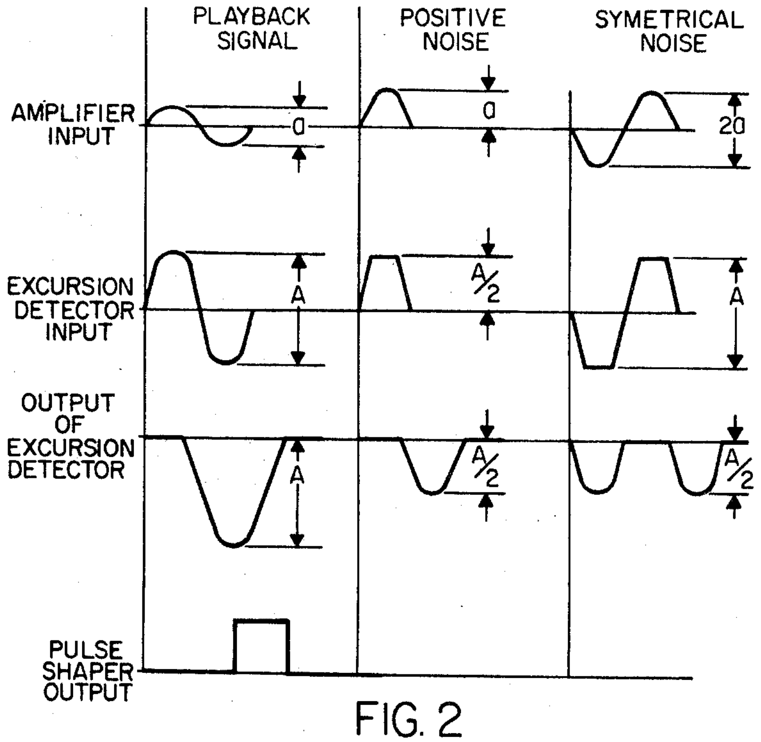
FIG. 2 is a series of waveforms illustrating the operating characteristics of the circuit of FIG. 1.

FIG. 2 illustrates the action of this amplifier in response to three types of inputs. The first input illustrated is for an input of magnitude *a* to the amplifier. Below this is shown the output of the amplifier ahead of the excursion detector showing the input waveform amplified, but within the limits of the positive and negative limiting networks, whose levels are shown as A/2 and −A/2 respectively. The negative-going slope from the limits A/2 to −A/2 is passed by the excursion detector as a pulse of amplitude A to trigger the pulse former to provide a pulse as shown on the bottom of the chart.

When a positive pulse of amplitude *a* or greater is introduced at the input of the amplifier, it will be amplified and clipped by the positive limiting network to produce a signal of amplitude A/2, one-half the amplitude required to trigger the pulse former, thus resulting in no output from the pulse former. A similar action would result if a negative pulse were introduced. The third signal input illustrated is for a signal of double or greater than the required amplitude *a* but 180° out of phase. Such an input results in a severely clipped wave still in phase with the input as shown. Since there are two regions with a negative-going voltage, the output of the excursion detector results in two output pulses, each of only one-half the required amplitude to trigger the pulse former, again resulting in no output.

In one specific embodiment of FIG. 1 the following component values have been utilized to achieve very satisfactory operation; however, it will be appreciated that these values are given by way of example.

| | | |
|---|---|---|
| R1, R12 | kΩ | 24.3 |
| R2 | kΩ | 2.21 |
| R3 | kΩ | 475 |
| R4 | Ω | 402 |
| R5 | kΩ | 243 |
| R6 | kΩ | 2.1 |
| R7 | kΩ | 1.21 |
| R8 | kΩ | 5.76 |
| R9 | kΩ | 1.62 |
| R10, R15 | Ω | 909 |
| R11 | kΩ | 2.37 |
| R13 | Ω | 715 |
| R14, R17 | kΩ | 211 |
| R16 | Ω | 499 |
| T1 | | Fenwal JA–41J1 |
| C1, C2, C3 | mf | .003 |
| C4 | pf | 47 |
| Q1, Q2, Q3 | | 2N2222A |
| Q4 | | 2N708 |
| D1, D2, D3, D6 | | 1N270 |
| D4, D7 | | 1N914 |
| D5 | | IN645 |

While there has been shown and described a specific embodiment of the invention, other modifications will readily occur to those skilled in the art.

What I claim is:

1. An apparatus supplied with an operating potential source connected to ground and a positive potential terminal for the evaluation of read signals corresponding to data magnetically recorded and in which an amplifier circuit means for producing amplification of read signals includes: first limiting means operative to limit said amplified signal excursion in a first direction, second limiting means operative to limit said amplified signal excursion in a second direction, and an excursion detector operated to pass a read signal only of the magnitude determined by said first and second means, said excursion detector including pulse polarizing means adapted to pass only negative-going signals, and a monostable multivibrator operated in response to a passed read signal from said excursion detector to produce a shaped pulse.

2. Apparatus according to claim 1, wherein said amplifier includes a final amplification stage comprising an NPN transistor and said excursion detector comprises: a capacitor and resistor in series connected from said transistor emitter to ground potential and a diode with its cathode connected to ground shunting said resistor.

3. Apparatus according to claim 2, wherein said first limiting means comprises: a first and a second resistor in series connected respectively from ground to the positive potential supply with their common terminals connected to the anode of a diode whose other terminal is connected to the base of said transistor and further having a capacitor connected from said diode anode to ground.

4. Apparatus according to claim 2, wherein said second limiting means comprises: a parallel resistor and capacitor connected from the collector of said transistor to the positive potential supply.

5. Apparatus according to claim 3, wherein said second limiting means comprises: a parallel resistor and capacitor connected from the collector of said transistor to the positive potential supply.